June 5, 1951  A. J. NANNINGA  2,556,100
ELEVATING DEVICE
Filed April 11, 1947　　　　　　　　　　　　2 Sheets-Sheet 2
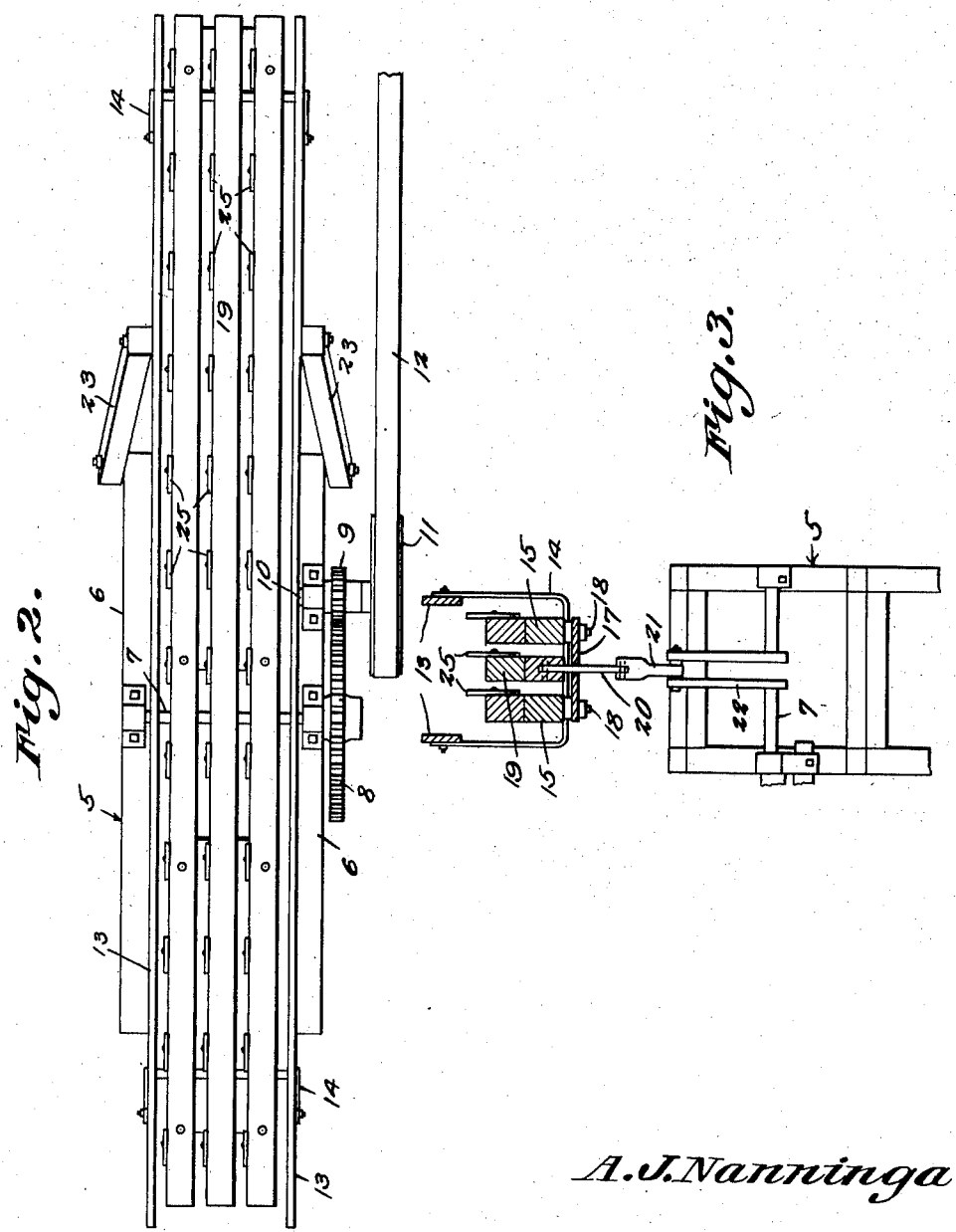
A. J. Nanninga
INVENTOR Patented June 5, 1951

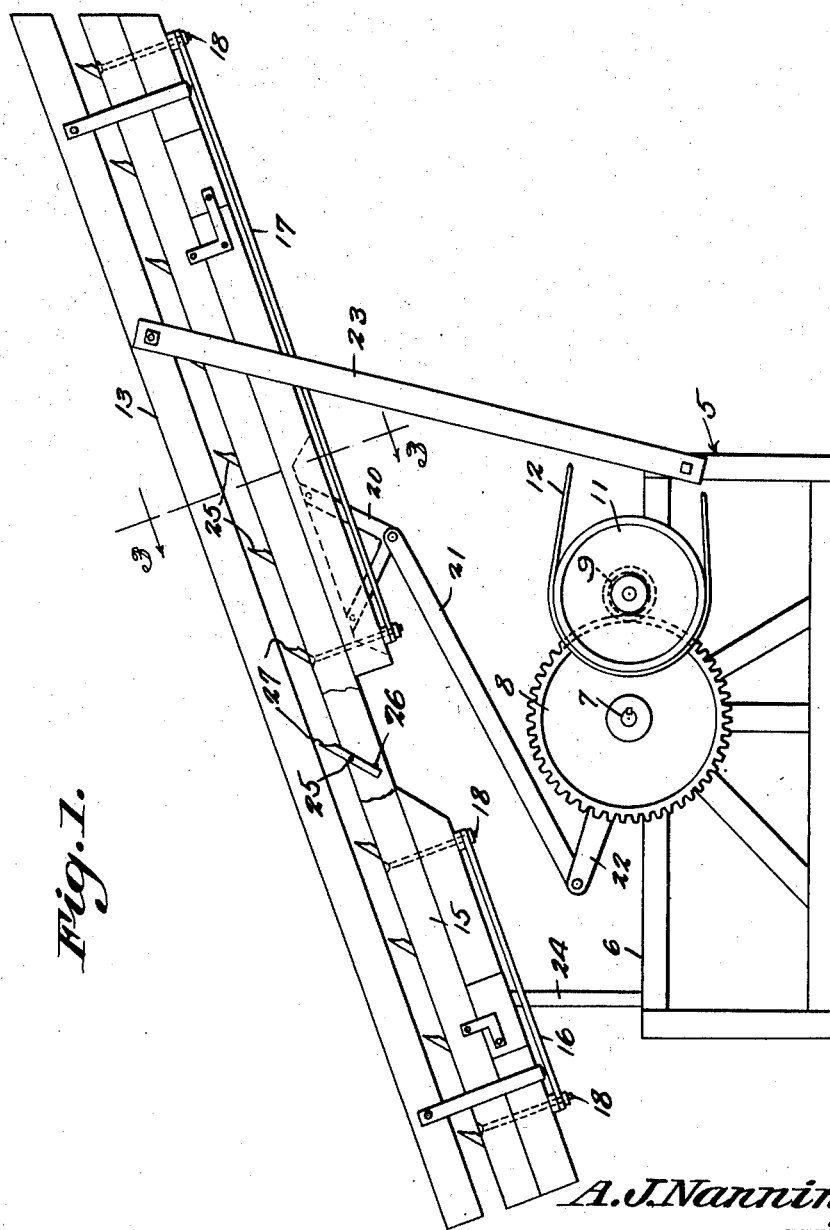

2,556,100

UNITED STATES PATENT OFFICE 2,556,100

ELEVATING DEVICE

Arnold J. Nanninga, Leonardville, Kans.

Application April 11, 1947, Serial No. 740,733

1 Claim. (Cl. 198—223)

This invention relates to an elevating or loading device, the primary object of the invention being to provide a portable loading device which may be readily and easily transported and used in elevating heavy bales from the ground, to an elevation for delivery into a wagon bed, storage house or the like.

An important object of the invention is to provide a device of this character embodying a movable bar having pivoted prongs thereon, for engagement with the article, preferably bales of feed, to move the bales upwardly to the discharge end of the device.

Another object of the invention is to provide means which, during the upward movement of the bales over the base of the device, will be automatically moved to their inactive positions, but will move to their active positions to prevent reverse movement of the bales, upon one movement of the reciprocating elevating bar.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing:

Figure 1 is a side elevational view of an elevating or loading device, constructed in accordance with the invention.

Figure 2 is a plan view thereof.

Figure 3 is a sectional view taken on line 3—3 of Figure 1.

Referring to the drawing in detail, the device comprises a support, indicated generally by the reference character 5, which is in the form of a rectangular frame including side rails 6 on which bearings are mounted, in which the shaft 7 operates. Secured on the shaft 7 is a substantially large gear 8 which meshes with the gear 9, secured to the shaft 10, on which the pulley 11 is secured, the pulley 11 receiving power from a suitable power device, not shown, through the belt 12.

The device also comprises parallel side bars 13, which provide a support for the bars forming the elevating members and to be hereinafter more fully described.

The parallel bars 13 are secured to the upper ends of the U-shaped frames 14, to which the stationary bars 15 are secured.

Plates 16 and 17 are connected to the bars 15 by means of bolts 18, providing a rigid support for the bars to hold them stationary at all times.

As clearly shown by the drawings the stationary bars 15 are spaced an appreciable distance apart, and between these bars the movable or elevating bar 19, operates, the bar 19 being provided with the bracket 20 which depends therefrom, and to which the link 21 connects, the link 21 being also connected with the crank arm 22 forming a part of the power shaft 7.

Upwardly extended brace arms 23 have their lower ends connected with the support 5, while their upper ends are bolted to the parallel side bars 13. At the opposite end of the support 5 are the posts 24 that connect with the lower end of the stationary bars 15, thereby holding the elevating device in an inclined position with the lower end adjacent to the ground surface, while the upper end thereof is disposed adjacent to a wagon body or bin to be filled with the bales of material being loaded into the wagon body or bin.

Pivotally secured to the stationary bars and movable bar 19, are fingers 25, which are adapted to move against the stop pins 26 secured to the bars, restricting movement of the fingers in one direction, for permitting the fingers to swing to positions wherein the pointed ends 27 thereof will lie below the upper edges of the bars.

Thus it will be seen that when the machine is in operation, the bales of feed positioned on the lower end of the device, will be moved upwardly with each sliding movement of the elevating bar 19, the fingers 25 thereof biting into the bales to move them with the bar 19.

As the bar 19 moves upwardly, the fingers 25 of the stationary bars will move downwardly, allowing the bales to slide therethrough. Upon return movement of the elevating bar the fingers of the stationary bars will swing upwardly providing stops to prevent the bales gravitating to the bottom of the loader.

As the machine is operated, the bales are moved from the lower end of the device to the upper or discharge end thereof with a step-by-step motion.

Having thus described the invention, what is claimed is:

A portable bale loading device comprising a frame, a pair of stationary upwardly inclined spaced parallel supporting bars mounted on the frame, a reciprocating elevating bar operating within the space between the stationary supporting bars, the upper surfaces of the bars being normally in the same plane, forwardly inclined pivoted stop fingers on the first-mentioned bars extending above the supporting bars, means for restricting rearward pivotal movement of said stop fingers said stop fingers adapted to engage bales moving thereover preventing return movement of the bales, forwardly inclined stop fingers mounted for pivotal movement on the elevating bar, means for restricting rearward movement of the stop fingers of the elevating bar, in one direction, the fingers of the elevating bar engaging bales positioned on the stationary upwardly inclined supporting bars moving the bales upwardly over the first-mentioned fingers, means for reciprocating the elevating bar upwardly and forwardly between the stationary bars feeding the bales longitudinally of the loading device, U-shaped frame members to which said stationary supporting bars are secured, and parallel bars secured to the upper ends of the U-shaped frame members providing a guide for bales moving over the stationary supporting bars.

ARNOLD J. NANNINGA.

REFERENCES CITED

The following references are of record in the file of this patent:

UNITED STATES PATENTS

| Number | Name | Date |
|---|---|---|
| 122,750 | Whitney | Jan. 16, 1872 |
| 207,554 | Sager | Aug. 27, 1878 |
| 236,485 | Conner | Jan. 11, 1881 |
| 265,394 | Culver | Oct. 3, 1882 |
| 416,764 | Towne | Dec. 10, 1889 |